United States Patent [19]
Valente

[11] 3,803,961
[45] Apr. 16, 1974

[54] APPARATUS FOR FABRICATING ELONGATED STRUCTURAL MEMBERS, OR THE LIKE

[75] Inventor: Raymond L. Valente, Kankakee, Ill.

[73] Assignee: Manco Mfg. Co., Bradley, Ill.

[22] Filed: Oct. 17, 1972

[21] Appl. No.: 298,336

Related U.S. Application Data

[63] Continuation-in-part of Ser. No. 94,474, Dec. 2, 1970, Pat. No. 3,712,161.

[52] U.S. Cl............................. 83/71, 83/217, 83/368, 83/560, 408/88
[51] Int. Cl............................................. B26f 1/02
[58] Field of Search ........ 83/560, 558, 71, 368, 216, 83/217; 408/88, 70, 3

[56] References Cited
UNITED STATES PATENTS

| | | | |
|---|---|---|---|
| 1,241,254 | 9/1917 | Payne | 83/216 X |
| 3,094,015 | 6/1963 | Mead | 408/3 |
| 3,094,028 | 6/1963 | Ausenda et al. | 83/71 |
| 3,448,645 | 6/1969 | Graf et al. | 83/71 |

Primary Examiner—J. M. Meister
Attorney, Agent, or Firm—Olson, Trexler, Wolters, Bushnell & Fosse, Ltd.

[57] ABSTRACT

A machine for effecting fabrication of a structural member including tool means, drive means for advancing a structural member longitudinally of a work station, and apparatus for properly positioning the tooling means with respect to predetermined locations on the structural member at which tooling operations are to be performed. The positioning apparatus includes an indexing arrangement, as well as gauge means which permit the automatic or semi-automatic operation of the machine, such that the tooling means may be initially positioned with respect to a transverse axis of the structural member and then moved along the axis in relatively short, controlled increments. The amount of error in positioning of the tool is maintained at a minimum and is at all times no greater than half the distance of the spacing of teeth on a gear rack which is engaged by pressure holding means.

6 Claims, 5 Drawing Figures

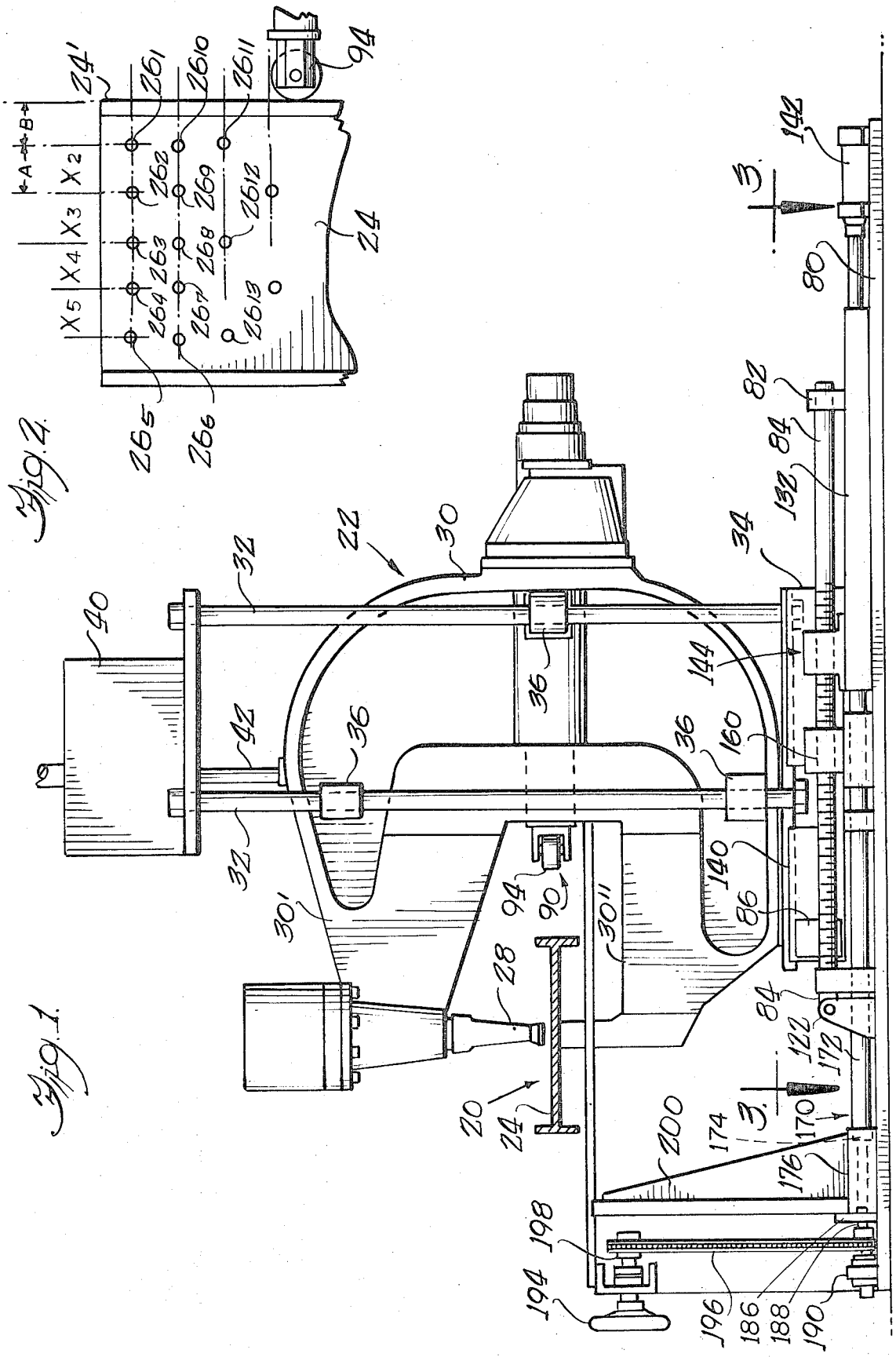

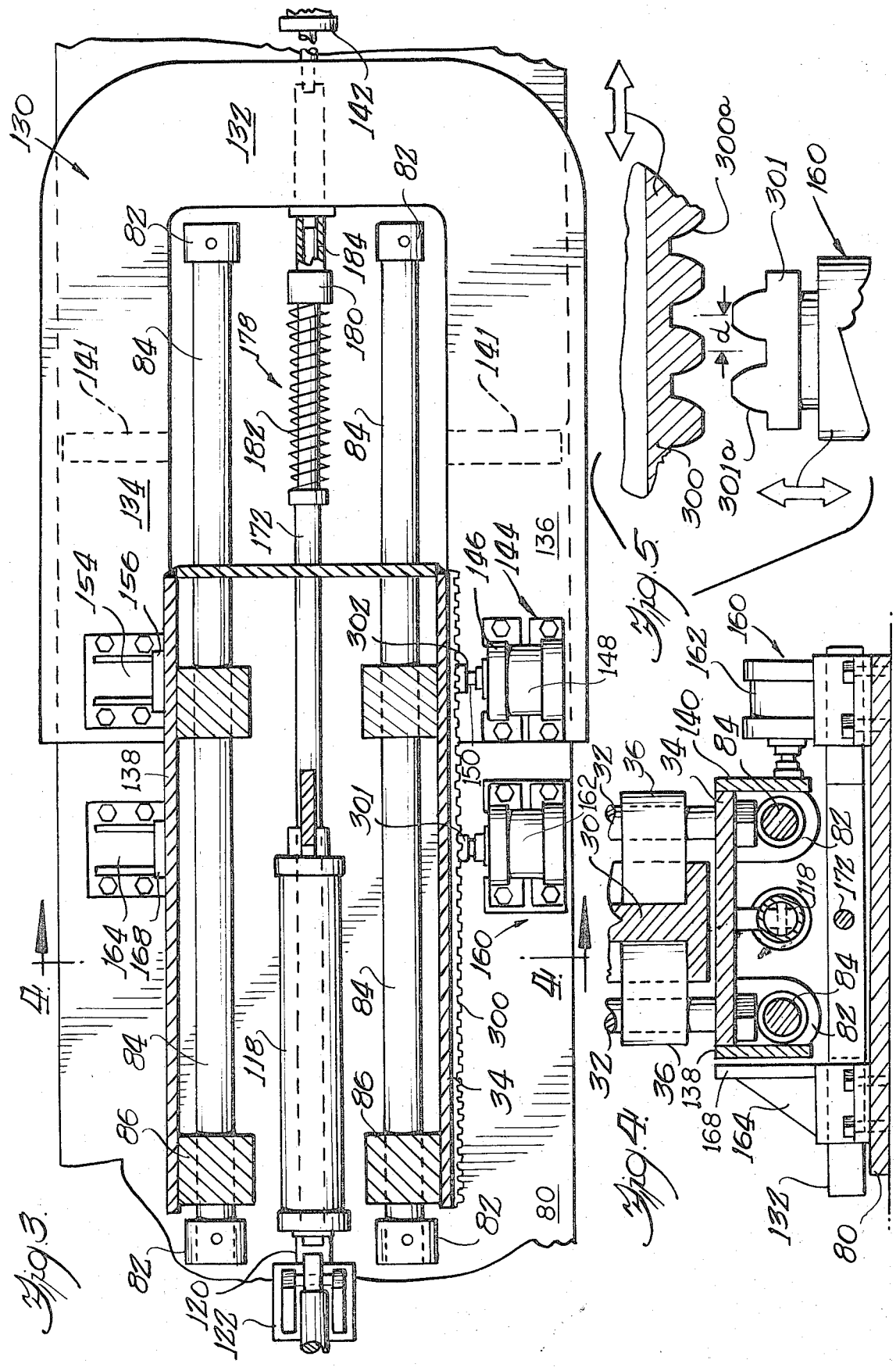

APPARATUS FOR FABRICATING ELONGATED STRUCTURAL MEMBERS, OR THE LIKE

REFERENCE TO RELATED APPLICATION

This is a continuation-in-part of my earlier filed application Ser. No. 94,474 filed on Dec. 2, 1970, now U.S. Pat. No. 3,712,161.

BACKGROUND OF THE INVENTION

This invention relates to apparatus for use in the fabrication of elongate structural members, or workpieces, such as angle irons, channel irons, I-beams, or the like. More particularly, the present invention provides novel apparatus for performing automatically a plurality of tooling operations at numerous locations spaced along the length of the structural member. Each said location, for reference purposes is defined as an axis extending transversely of the elongate axis of the structural member with one or more said tooling operations being performed at selected points on said transverse axis.

Programmed fabricating apparatus are available including systems for the fabrication of structural members. However, these systems utilize complex, highly sophisticated circuitry and programming apparatus. Accordingly, many fabricators and users of structural members, who would prefer to automate their existing equipment, or purchase new automated equipment, have been dissuaded by the inherent economical disadvantages of the available systems. More specifically, the precision programming and sensing means employed in these systems require an initial capital investment that is prohibitive in many cases. Also, due to the relative complexity of these systems, set-up time is lengthy, thus rendering these systems practical for long production runs only. Unfortunately, most fabricators are confronted primarily with relatively short production runs, such that the additional cost factors of these prior art systems cannot be justified. This is especially true, since in most instances the tolerances that are to be maintained, while critical within certain limits, do not necessitate the precision built into available systems.

Accordingly, not having adequate, economically feasible equipment available, most fabricators resort to a manually controlled fabricating operation. That is, an operator controls the movement of the workpiece relative to a tooling station and with repeated reference to the detailed production drawings properly aligns said workpiece with respect to said station. When this is accomplished, the fabricating apparatus is actuated. Next, the workpiece is repositioned to bring the next point at which an operation is to be performed into alignment with the tooling station and the cycle repeated again. However, this mode of fabrication requires the constant attention of the operator, as well as repeated and time-consuming checks and cross-checks with the production drawings.

SUMMARY OF THE INVENTION

The apparatus of the present invention is used to accommodate the fabricating of I-beams, wherein a pattern or series of holes are to be formed therein. These holes are formed at various locations spaced along the length of the beam, which, for reference purposes, will be referred to hereinafter as the transverse or Y-axes. In addition, the spacing of the points on respective transverse axes may vary from location to location, such that the apparatus must be able to accommodate these variances. Further, it is to be realized that while the following detailed description of the invention, as well as the accompanying drawings, are concerned with a punching operation, the invention may be employed with tooling of various types.

Accordingly, the present invention concerns a novel apparatus which permits a fabricator to automate his equipment without a large capital investment for complex control systems. More specifically, the advantages and improvements afforded by the present invention are attained by the provision of apparatus including a work station, positioning means for orienting a workpiece with respect to the work station, and control means for effecting operation of the apparatus at the proper point in the fabricating cycle. The various components which comprise the novel apparatus of this invention are ingeniously simple and uncomplicated when compared to the sophisticated prior art devices, both from a structural, as well as an operational standpoint. However, although simple and economical, the apparatus of the present invention is capable of obtaining substantially the same end results as the aforementioned systems.

An object of this invention is to provide a hitch feed control mechanism for incrementally advancing the punch tool of the apparatus transversely across the structural member in increments having a dimension less than the tolerance deviation allotted to the spacing between points on the structural member.

DESCRIPTION OF THE DRAWINGS

FIG. 1 is an end elevational view of a tooling station for fabricating apparatus constructed in accordance with the present invention;

FIG. 2 is a partial, top plan view illustrating typical series or patterns of holes which may be formed on an elongate structural member;

FIG. 3 is a longitudinal sectional view taken along the line 3—3 of FIG. 1 and illustrating the supporting and indexing arrangements employed for the tooling station of said apparatus;

FIG. 4 is a partial sectional view taken along the line 4—4 of FIG. 3 showing a clamping arrangement employed to fix the position of the tooling station with respect to the workpiece; and FIG. 5 is an enlarged detailed showing of the gear rack and toothed holding pad for advancing and retracting the punch mechanism in accordance with this invention.

DETAILED DESCRIPTION OF THE ILLUSTRATED EMBODIMENT

Referring now to the drawings, FIG. 1 illustrates the general construction of a tooling station 20 of the novel fabricating apparatus of the present invention, said apparatus being designated generally 22. The apparatus 22 is designed to accommodate an elongate structural member 24, such as the illustrated I-beam. The I-beam 24 is supported on a frame or stand (not shown) and is operatively engaged by drive means (also not shown) capable of producing controlled longitudinal movement of the I-beam 24 relative to the tooling station 20. In the illustrated embodiment, station 20 employs tooling means in the form of a punch head 28 designed to form aperture 26 in the web portion of I-beam 24. However, it is to be understood, that the tooling station 20 may be of a general type, other than that illustrated.

By way of background, the I-beams 24, as well as other structural members capable of fabrication of the present invention, are used in the erection of buildings or other structures. In this regard, numerous apertures 26 must be formed in the members to provide for interconnection during assembly. Most frequently, it is necessary that a plurality of apertures in a prescribed pattern be formed in the I-beam at various locations along their length, as illustrated in FIG. 2. However, from beam to beam, the patterns will vary, not only as to the location along the length of the beam, but also with regard to the arrangement thereof. That is, at one location, five apertures evenly spaced across the width of the beam may be required, while at the next location, only two such apertures may be desired.

While a high degree of accuracy is not absolutely necessary in the placement of the apertures 26, it is necessary that their positioning be sufficiently controlled so that these apertures align with corresponding apertures formed in structural members to be connected thereto. Thus, the problem resolves itself into that of properly positioning the punch head 28 with respect to the I-beam for the formation of each aperture. This problem is complicated somewhat by the fact that in rolling or forming of the I-beam, a "beam camber" is generally encountered, that is, the beam will have a slight curvature along its entire length. However, as will be explained more completely hereinafter, this factor is taken into consideration and easily solved by the present invention.

In FIG. 2, there are illustrated typical patterns of holes 26 that may be formed in the end of an I-beam 24. It is to be kept in mind, that these patterns are closely spaced in FIG. 2 for illustrative purposes, and in practice, the distance between the respective patterns along the length of the beam may be considerable. For reference purposes, each hole 26 is defined or located by the intersection of an X-axis and a Y-axis, the former being disposed longitudinally of the elongate beam 24 and the latter transversely of said beam. In the illustration of FIG. 2, five X-axes are illustrated and labeled $X_1-X_5$, while only three Y-axes $Y_1-Y_3$, are shown. If the pattern of holes 26 along each of the transverse or Y-axes were to be the same, there would be little or no problem, however, such is not the case, in practice, as said patterns will vary.

Considering now the fabricating cycle, it is necessary to attain both longitudinal and transverse movement of the I-beam 24 relative to a tooling station 20 so as to position properly the punch head 28 over the exact location for the hole 26. With the illustrated apparatus 22, the I-beam 24 is moved longitudinally of the tooling station 20 by drive means (not shown) capable of controlled operation. In this regard, various forms of drive means may be employed, for example, the beam could be operatively connected to a carrier or truck-like member, or engaged by drive rollers mounted on the beam supporting stand. One form of automated longitudinal drive means is illustrated in U.S. application Ser. No. 32,097, filed Apr. 27, 1970, wherein a template is used to program longitudinal movement. Thus, it is possible to align properly the tooling station 20 with a desired transverse or Y-axis. However, it is still necessary to produce transverse movement of the tooling station 20 relative to the beam in order to properly locate the punch head 28 over the precise point on the aligned Y-axis where the apertures 26 are to be formed. In addition, due to the beam camber, it is necessary to provide positioning means capable of effecting initial positioning of the punch head 28 that is uniform for each location along the length of said beam. It is to the solution of the last two mentioned problems that the present invention is directed.

Returning to FIG. 1, tooling station 20 is comprised primarily of a C-shaped frame 30 which carries the punch head 28 on an upper arm 30' thereof and is mounted for vertical movement on guide rods 32. The guide rods 32 are in turn carried by a slidably mounted base platen 34 (as explained more completely hereinafter) and they extend upwardly through guides 36 on said frame 30 for connection at their upper ends with a plate 38. A housing 40 is disposed atop plate 38 and contains therein a drive arrangement designed for effecting vertical positioning of the C-shaped frame 30, and correspondingly punch head 28, the specifics of this drive means will be detailed more completely with regard to FIGS. 8 and 9 of the parent application Ser. No. 94,474 filed Dec. 2, 1970. For the present, it is sufficient to realize that the upper portion of the frame 30 includes a vertically extending rod 42 which is threadedly engaged with driven means mounted within said housing 40, such that the frame 30 may be raised and lowered in order to position the punch head 28 properly with respect to I-beam 24.

The vertical guide rods 32 which support the C-shaped frame 30 are carried by a slidably mounted base platen 34. As can be viewed in the lower portion of said figure, there is provided a stationary base 80 that is preferably anchored to the floor. This base 80 has two pair of spaced rod blocks 82 which support a pair of horizontal guide rods 84, each of which is received within the guide bearings 86 of said base platen 34. Accordingly, said base platen 34 and the punch head 28, carried by the frame 30, are mounted for slidable movement transversely of the path of longitudinal movement of the I-beam 24.

The apparatus for attaining the initial positioning of the punch head 28, as well as that utilized for the subsequent indexing of the punch head will now be considered. In this regard, the spacing of the apertures 26 on any given transverse Y-axis is generally some multiple of a given value, "A" which is represented by the spacing between the individual longitudinally extending axes $X_1-X_5$. Accordingly, initial positioning of punch 28 must be effected relative to some datum point and, then the punch indexed through a distance "A," "2A," "3A," or some other multiple thereof to the precise point where an aperture 26 is to be formed. For convenience purposes, this datum point may be chosen as that point at which the aperture 26, closest to the edge 24' of the I-beam is to be located, that is to say, along the axis $X_1$. Accordingly, since the distance from the edge 24' to the axis $X_1$ can be measured and will remain constant at all times, this value, which is designated "B" for reference purposes, can be employed to effect initial positioning of the punch head 28.

The web portion of the I-beam 24 is disposed intermediate the upper and lower portions 30' and 30" of the C-shaped frame 30. Thus, assuming alignment of the center line of punch 28 with a desired Y-axis, in order to locate the punch head over the datum point $X_1$, it is merely necessary to provide some form of guide means which will space said punch head 28 a distance "B" from the edge 24'. However, it must be kept in mind that the beam 24 has camber or curvature along its length, such that this positioning means 90 must be able to accommodate this variance.

In actual practice, the appratus 22 includes a Y-axis readout (not shown) that provides a visual indication of the precise spacing between the roller 94 and the center line of punch head 28. Accordingly, after alignment of the punch head 28 with a selected Y-axis, the cylinder 118 is operated to bring gauge roller 94 into engagement with the edge 24' of the I-beam. The operator then energizes the gauge roller drive motor 112 which, by means of the aforementioned engagement of said roller with the I-beam, will cause the punch head 28 to move along the selected Y-axis. Thus, when the Y-axis readout indicates that said spacing corresponds to a value equal to the distance "B," the center line of the punch 28 will be disposed immediately above the intersection of the selected Y-axis and the datum line, the $X_1$ axis. The punch head 28 is now in position to form an aperture 26 at the datum line $X_1$, should this be desired; or the frame is in position for indexing along said Y-axis to the point where the first aperture 26 is to be formed. Thus, the initial positioning of the punch head having been achieved, attention is now invited to FIGS. 3 and 4 for a discussion of the means employed to achieve this indexing.

Attention is directed first to FIG. 3 in order to attain a proper perspective of the disposition of the indexing means 130 with relation to the overall apparatus. In this regard, said figure is a sectional view taken along the line 3—3 of FIG. 1 immediately below the uppermost surface of the base platen 34, such that both sidewalls of said platen and the far right end wall, as viewed, are shown in section.

Indexing means 130 is comprised primarily of a U-shaped yoke or frame 132, having leg portions 134 and 136, which are spaced apart a sufficient distance to receive therebetween the sidewalls 138 and 140 of base platen 34. Yoke 132 is mounted for slidable movement relative to the base 80 by means of one or more pair of bearing pads 141. Also, this slidable mounting of yoke 132 is totally independent of the base platen 34, such that the legs 134 and 136 may move relative to the sidewalls 138 and 140, with the inner edges of said legs being disposed proximate the surfaces of the sidewalls for a purpose to be discussed more completely hereinafter. A prime mover, in the form of an air cylinder 142, is fixed to the base plate 80 and is operatively connected to the yoke 132 to effect the aforementioned slidable movement.

In order to impart movement to the base platen 34 and the punch head 28 and frame 30 carried thereby, the yoke 132 is provided with a clamping arrangement 144 illustrated in FIG. 3. In this regard, the leg 136 carries an actuator assembly 146, which in the illustrated embodiment includes an operating cylinder 148 having a retractable rod 150 with an end pad 302 adapted to engage an element 300 on of the sidewall 140 upon operation said cylinder 148 as described below. It should be noted, that a solenoid arrangement may be substituted for the operating cylinder 148, if desired. On the opposite yoke leg 134, there is provided a bracket 154 which carries a wear pad 156, said bracket being in alignment with the actuator 146. Initially, a clearance exists between the sidewalls of platen 34 and the wear pad 156 and the end pad 302, respectively, of approximately 0.010 inches on each side. Thus, when the cylinder 148 is operated, the rod end pad 302 will engage the element 300 on the wall 140 forcing the opposite wall 138 into contact with the wear pad 156 to produce an interconnection between the yoke 130 and the base platen 34, which permits joint movement. In this regard, it should be noted that the mounting for said base platen 34 includes sufficient play to permit the slight movement of said base platen required during the clamping operation.

With the base platen 34 clamped between the legs 134 and 136 of the yoke 132, it can be seen that any movement of said yoke 132 produced by the prime mover 142 will result in corresponding movement of the base platen 34 along its supporting rods 84.

Next, with reference to FIG. 4, an additional clamping assembly 160, identical to the assembly 144, is provided at a point spaced from the end of the yoke legs 134 and 136. In this regard, an operating cylinder 162, as well as the bracket 164, are fixed to the base plate 80. Accordingly, when the clamp 160 is operated, the engagement of the rod end pad 301 with the element 300 on the wall 140 of the platen will force the opposed wall 138 into engagement with the bearing pad 168 on the bracket 164. This clamping engagement fixes the position of the base platen 34 with regard to the stationary base 80, thus precluding relative movement of the frame 30 and punch head 28 with respect to the beam support frame (not shown), during punching of said I-beam 24.

From the above discussion, it can be seen that the interaction of the yoke 132 and the clamp 144 can be employed to effect movement of the base platen 34 and the associated punch 28 along the length of the selected Y-axis. In addition, once the desired positioning of the punch head 28 is reached, the clamp 160 may be activated to maintain the positioning of said punch 28. However, as will be recalled from the prior discussion, it is necessary that the platen 34 be indexed through only the distance "A," viz., the spacing between the respective X-axis, and as such, some means must be provided to accomplish this end. Thus, attention is now directed to the means employed to achieve the desired indexing, with a complete description of the operating cycle to be detailed later.

Considering first the operation of the yoke 132, it can be seen that the prime mover, piston 142, has a given stroke which defines the maximum length of movement that can be attained by the platen 34 at any one indexing operation. That is, with the piston 142 in the retracted position, if clamp 144 is operated to engage the base platen 34 and then piston 142 is energized, the distance through which the platen assembly 34 and punch head 28 will move will be equal to the stroke of said piston. However, in practice, the desired indexing distance "A" will vary from one production run to another, and most always will be considerably less than the stroke of the prime mover 142. Accordingly, limiting means is employed to control effectively the stroke of the piston 142 and to provide only the desired indexing movement. This limiting means is readily adjustable to accommodate variances in the design requirements encountered in day-to-day operation.

The preferred form of limiting means 170 utilized with the illustrated embodiment can best be understood with reference to FIGS. 1 and 3. In this regard, the primary element of said limiting means is an elongate rod 172 which, as shown in FIG. 1, extends beneath the mounting arrangement for the base platen 34. One end 174 of this rod (the left end as viewed in FIG. 1) is non-rotatably connected to a sleeve 176, while the opposite end 178 is positioned to engage the base segment of the U-shaped yoke 132, as seen in FIG. 3. Accordingly, the amount that the yoke 132 can be moved by the prime mover 142 is controlled or limited by the spacing of rod end 178 from the base segment of said yoke. That is, with the rod 172 fully retracted to the left, the yoke 132 will move to a distance equal to the stroke of the piston 142; on the other hand, with the rod 172 fully extended to the right, end portion 178 will engage the yoke when the piston 142 is fully retracted so that movement thereof is precluded. By spacing the end portion 178 from the yoke 132 at a point somewhere between the above-mentioned extremes, the stroke of the prime mover or the piston 142 can be adjusted and controlled as desired, viz., selected to produce an indexing movement equal to the distance "A."

The end portion of the rod 172, approximate end 178, is designed to accommodate any shock occasioned with the operation of the yoke 132. That is, there is provided a slidably mounted block 180 that is urged toward the yoke 132 by a spring 182, stop means maintaining the block on said rod. The yoke 132, in turn, has an abutment member 184 carried thereon for engagement with the spring biased block 180, as can be seen in FIG. 3. Accordingly, as the yoke 132 moves forward, the abutment 184 will strike the block 180 with any shock occasioned therewith being absorbed by the spring 182.

The adjustment in the positioning of the rod 172 is attained primarily by means of the aforementioned sleeve 176 which is non-rotatably connected to the end portion 174 of said rod. The sleeve 176 is also non-rotatably mounted with regard to the base 80, although free to move horizontally along the surface of said base. The left-hand end of the sleeve 176 is defined by an internally threaded cap-nut 186, which is engaged with an externally threaded drive screw 188 journalled for rotative movement by a bearing block 190. The drive screw 188 carries a sprocket gear 192 thereon that is operatively connected with a handwheel 194 by means of a sprocket chain 196 and a second sprocket gear 198 carried by the axle of said wheel. Accordingly, when the wheel 194 is turned, rotation is imparted to the drive screw 188 which causes the sleeve 176 and the associated elongate rod 172 to move horizontally.

The improved aspects of this invention are directed to a hitch feed mechanism used for advancing the positioning of the punch unit 28 transversely of the web portion of the structural member 24. The hitch feed mechanism includes the previously mentioned element 300 in the form of a gear rack 300 secured to the side of the base platen 34, as seen in FIGS. 3 and 4. The end pads 302 and 301 of clamp assemblies 144 and 160 are in the form of gear-shaped pad elements, respectively, to engage with the teeth of the gear rack during advancing and retracting of the platen 34. The operation of the clamp assemblies 144 and 160 together with the yoke 132 and base platen 34 are exactly the same as mentioned above, the only difference being that precise measurement of movement is obtained by the fact that a gear rack and gear-shaped pads are now used. Preferably, the shape of the gear rack 300 is that shown in FIG. 5 having rounded side surfaces 300a of the teeth to be engaged with correspondingly shaped rounded side surfaces 301a of the gear-shaped pad 301. The distance between the center of the gear tooth and the center of the valley between teeth is indicated by reference letter $d$. The increment of movement of the base platen to shift the position of the C-frame 30 is then controlled by the total accumulated distance along the gear rack. This is accurately obtained by the fact that the distance between the gear teeth are at all times fixed. Should slight misalignment occur between the gear rack 300 and the gear-shaped pads 301 and 302 automatic alignment will occur upon inserting of the gear teeth of the pad into the gear spaces of the gear rack. This will insure proper alignment of the punch 28 within a dimension of one gear tooth. In the preferred embodiment of this invention the distance $d$ is in the order of one-sixteenth of an inch and accordingly, variations and dimensions can be obtained in incremental movements of one-sixteenth of an inch and more.

Accordingly, the improved aspects of this invention provide means for accurately adjusting the position of the punch 28 transversely of the web of the I-beam 24 in incremental amounts of one-sixteenth of an inch or more. While a single specific configuration of gear rack and gear-shaped pads are shown, it will be understood that variations and modifications of this invention may be effected without departing from the spirit and scope of the novel concepts disclosed and claimed herein.

The invention is claimed as follows:

1. A machine for use in a fabricating cycle wherein a plurality of tooling operations are performed on an elongate workpiece, said operations being performed at one or more points on selected axes extending transverse to the elongate axis of said workpiece and disposed along the length thereof; said machine comprising: a work station including tool means for performing said tooling operations; advancing means for effecting relative longitudinal movement of the workpiece with resepct to said work station so as to align said tool means with a selected one of said transverse axes; and apparatus for operating said machine to affect the fabricating cycle, said apparatus including initial positioning means operable to align said tool means with a first point on said selected transverse axis, indexing means for producing relative movement to position said tool means in relation to additional selected points on said transverse axis, said indexing means including a gear rack positioned in a direction parallel to said transverse axis and reciprocal means capable of selective, operative connection and disconnection with said gear rack for producing said relative movement, and control means for coordinating the operation of said tool means and said indexing means to achieve the fabricating cycle.

2. The machine according to claim 1 wherein said reciprocal means includes gear-shaped pad means engageable and disengageable with said gear rack to control the distance of movement of said tool means in increments corresponding to the distance between the teeth on said gear rack.

3. The machine according to claim 2 wherein said gear rack has teeth with rounded side portions and said gear-shaped pad has teeth with similar rounded side portions, whereby automatic alignment of said tool means is accomplished by slight shifting thereof where the rounded teeth of said gear rack and said gear-shaped pad come together.

4. An indexing arrangement for use in a fabricating machine, or the like, wherein a series of operations are performed on a workpiece at predetermined points on a selected axis by tooling means, said indexing arrangement adapted to be operably associated with said tooling means and capable of indexing said tooling means along a path to the points on said axis at which said operations are to be performed, said indexing arrangement including; a member slidably mounted for movement along a path extending parallel to the path of movement of said tooling means for performing the operations; drive means operably coupled to said member for effecting reciprocal movement thereof; means carried by said member for effecting selectively operable connection of said member with said tooling means so that joint movement thereof may be attained; adjusting means for defining the length of the path of reciprocal movement of said member, said adjusting means including a gear rack associated with said member, and said lengths being selected to correspond to a multiple of the spacing between the teeth on said gear rack.

5. An indexing arrangement as defined in claim 4 wherein said slidably mounted member is of a U-shaped construction having a pair of spaced, parallel leg segments disposed in surrounding relation to a supporting portion of the tooling means, and said means for effecting operable connection of said member to the tooling means includes a clamping arrangement comprised of an actuator carried by one said leg segment and an abutment bracket carried by the other leg segment, said actuator having a gear-shaped pad at one end to engage with said gear rack to produce clamping engagement with said supporting portion in preparation for the effecting of joint movement of said member and said tooling means in increments corresponding to a multiple of the spacing between teeth on said gear rack.

6. An indexing arrangement as defined in claim 5 further including an additional clamping arrangement carried by a stationary supporting surface and adapted to engage said gear rack of the supporting portion of the tooling means to fix the position of said tooling means with respect to the supporting surface.

* * * * *